(12) United States Patent
Khare et al.

(10) Patent No.: US 8,768,095 B2
(45) Date of Patent: Jul. 1, 2014

(54) SYSTEM AND METHOD FOR PROCESSING DATA SIGNALS

(75) Inventors: Kedar Bhalchandra Khare, Niskayuna, NY (US); Christopher Judson Hardy, Niskayuna, NY (US); Kevin Franklin King, Waukesha, WI (US); Luca Marinelli, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 1295 days.

(21) Appl. No.: 12/541,550

(22) Filed: Aug. 14, 2009

(65) Prior Publication Data

US 2011/0038560 A1 Feb. 17, 2011

(51) Int. Cl.
*G06K 9/36* (2006.01)
*G06K 9/00* (2006.01)

(52) U.S. Cl.
USPC ............ 382/276; 382/128; 382/131; 382/132

(58) Field of Classification Search
CPC .............................. G06T 7/0012; G06T 11/60
USPC .................. 382/128, 131, 132, 276
See application file for complete search history.

(56) References Cited

U.S. PATENT DOCUMENTS

| 6,018,600 | A | 1/2000 | Levin et al. |
| 6,630,828 | B1 | 10/2003 | Mistretta et al. |
| 7,511,643 | B2 | 3/2009 | Baraniuk et al. |
| 7,558,414 | B2 * | 7/2009 | Griswold ................ 382/128 |
| 8,055,095 | B2 * | 11/2011 | Palotai et al. ............ 382/276 |
| 8,374,413 | B2 * | 2/2013 | Chen ...................... 382/131 |
| 2006/0029279 | A1 | 2/2006 | Donoho |
| 2008/0252290 | A1 | 10/2008 | Doyle |
| 2008/0270055 | A1 | 10/2008 | Rozell et al. |
| 2010/0011268 | A1 * | 1/2010 | Sinop et al. ............. 714/746 |
| 2011/0052023 | A1 * | 3/2011 | Garg et al. ............... 382/131 |

OTHER PUBLICATIONS

Lustig, M.; Donoho, D.L.; Santos, J.M. & Pauly, J.M.; "Compressed Sensing MRI"; Signal Processing Magazine, IEEE Publication, Mar. 2008 vol. 25, Issue: 2 on pp. 72-82.
Arian Maleki & David L. Donoho; "Freely Available, Optimally Tuned Iterative Thresholding Algorithms for Compressed Sensing"; SPARS'09—Signal Processing with Adaptive Sparse Structured Representations (2009); 6 Pages.

* cited by examiner

*Primary Examiner* — Matthew Bella
*Assistant Examiner* — Jose M Torres
(74) *Attorney, Agent, or Firm* — Scott J. Asmus

(57) ABSTRACT

A signal processing method is provided. The signal processing method includes the steps of generating undersampled data corresponding to an object, determining a variable thresholding parameter based on a composition of the undersampled data, and iteratively determining thresholded coefficients to generate a plurality of coefficients by utilizing the undersampled data, a current solution and the variable thresholding parameter by updating the variable thresholding parameter and the current solution, and reconstructing a data signal using the plurality of coefficients.

31 Claims, 6 Drawing Sheets

SYSTEM AND METHOD FOR PROCESSING DATA SIGNALS

BACKGROUND

Embodiments of the invention relate generally to a field of signal processing, and more specifically to reducing the number of data samples required for image/signal reconstruction.

With advances in various areas of technology, such as, but not limited to, imaging, networking, healthcare, audio, video entertainment and communications, huge volumes of data are frequently generated. More particularly, in imaging and healthcare applications, it may be desirable to acquire several images of one or more objects or patients and subsequently store these images, thereby entailing use of considerable storage space and processing time. Similarly, communication applications call for reductions in bandwidth and an increase in data transmission speed to communicate data. Traditionally, data compression techniques have been employed to aid in the efficient storage of such data. Data compression may entail encoding information using fewer bits (or other information-bearing units) than an unencoded representation would use through specific encoding schemes. By compressing the data, consumption of expensive resources, such as hard disk space or transmission bandwidth may be substantially reduced. Conventional compression techniques are usually applied as a post-processing step after the image/signal is reconstructed from the measured data.

Compressed sensing is a field of technology being increasingly used to aid in reducing the data measurements required for reconstructing the desired image and/or the desired signal. Through compressed sensing, it is recognized that images are often compressible, and thus image data may be acquired with fewer data samples. Conventional sampling requires the number of data samples associated with an image to be on the order of the number of pixels N in the image. The aim of compressed sensing is to start with fewer data samples (less than N, typically the number of data samples is of the order of degrees of freedom M in the image), and still achieve good image quality.

Furthermore, compressed sensing reduces the number of data measurements required for image/signal reconstruction. In Magnetic Resonance (MR) imaging or Computed Tomography (CT) imaging, it is desirable to obtain information about a subject by measuring a digital signal representative of that subject. These digital signals are used in construction of images, spectra, and volumetric images that are generally indicative of the state of the subject, which may be a patient's body, a chemical in dilution, or a slice of the earth, for example. However, capturing and processing data related to the underlying subject involve laborious and time-consuming processes. By way of example, performing a Magnetic Resonance Imaging (MRI) scan of a patient, performing a three-dimensional (3D) CT scan of a patient, measuring a 3D nuclear magnetic resonance spectrum, and conducting a 3D seismic survey typically entail time-consuming processes. Compressed sensing is significant in these fields of technology as it allows use of a lower x-ray dose (in the case of CT) and faster image acquisition for MR or CT, which could ameliorate problems, for instance, with cardiac and respiratory motion and contrast bolus timing in MR angiography.

Conventional methods for image reconstruction typically do not make any prior assumptions regarding the compressible nature of the final reconstructed images. Also, if an assumption about the compressible nature of the images is made and a compressed sensing technique is used, the methods used for image reconstruction generally require substantial processing time. More specifically, conventional compressed sensing techniques are generally iterative in nature, and employ complicated non-linear cost functions and, thus require substantial processing time. The non-linear cost functions, for example, include L1-norm, total variation, and the like. The processing time for image reconstruction may be reduced by minimizing the cost functions. However, the minimization of the cost functions by the conventional methods leads to computationally intensive operations, since the minimization of cost functions requires evaluation of derivatives of non-linear terms. Further, solutions obtained via minimization of cost functions are very sensitive to free parameters. The free parameters, for example, represent weights of the non-linear terms in the cost functions.

Thus, it is highly desirable to develop a compressed sensing technique that reduces processing time. More particularly, there is a need for an improved compressed sensing technique configured to enhance computational efficiency of signal processing, while substantially reducing memory requirements. Furthermore, there is also a need for an improved compressed sensing technique that minimizes usage of complicated cost functions. Moreover, there is a need for an improved compressed sensing technique where solutions determined via reduction of the usage of cost functions are not sensitive to the choice of free parameters.

BRIEF DESCRIPTION

Briefly in accordance with one aspect of the technique, a signal processing method is presented. The method includes generating undersampled data corresponding to an object, initializing a current solution, determining a variable thresholding parameter based on a composition of the undersampled data, iteratively determining thresholded coefficients utilizing the undersampled data, the current solution and the variable thresholding parameter to generate a plurality of coefficients, and reconstructing a data signal using the plurality of coefficients.

In accordance with still another embodiment of the present technique, a signal processing method is presented. The method includes generating undersampled data signal corresponding to an object, initializing a current solution, determining a variable thresholding parameter, determining an intermediate image utilizing the undersampled data and the current solution, determining wavelet coefficients corresponding to the intermediate image, determining thresholded coefficients by applying a thresholding operation on the wavelet coefficients using the variable thresholding parameter, determining an updated current solution using the thresholded coefficients, updating the variable thresholding parameter using a thresholding update factor, wherein the thresholding update factor depends on a composition of a desired image of the object, iteratively determining thresholded coefficients using the updated current solution, the updated variable thresholding parameter, and the undersampled data to generate the plurality of coefficients, and reconstructing a data signal using the plurality of coefficients.

In accordance with yet another embodiment of the present technique, a signal processing method is presented. The method includes generating undersampled data signal corresponding to an object, initializing a current solution, determining a variable thresholding parameter, determining an intermediate image utilizing the undersampled data and the current solution, determining wavelet coefficients corresponding to the intermediate image, determining thresholded coefficients by applying a thresholding operation on the wavelet coefficients using the variable thresholding parameter, determining an updated current solution using the thresholded coefficients, determining an updated current solution having smooth and sharp features using the updated current solution and a denoised intermediate current solution, updating the variable thresholding parameter using a thresholding update factor, wherein the thresholding update factor depends on a composition of a desired image of the object, iteratively determining thresholded coefficients using the updated current solution having smooth and sharp features, the updated variable thresholding parameter, and the undersampled data to generate the plurality of coefficients, and reconstructing a data signal using the plurality of coefficients.

In accordance with another embodiment of the present technique, a signal processing system is presented. The system includes an acquisition subsystem configured to generate undersampled data corresponding to an object and a processing subsystem in operational communication with the acquisition subsystem. The processing subsystem includes a signal processing platform configured to initialize a current solution, determine a variable thresholding parameter based on a composition of the undersampled data, iteratively determine thresholded coefficients by utilizing the undersampled data, the current solution and the variable thresholding parameter to generate a plurality of coefficients, and reconstruct a data signal using the plurality of coefficients.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
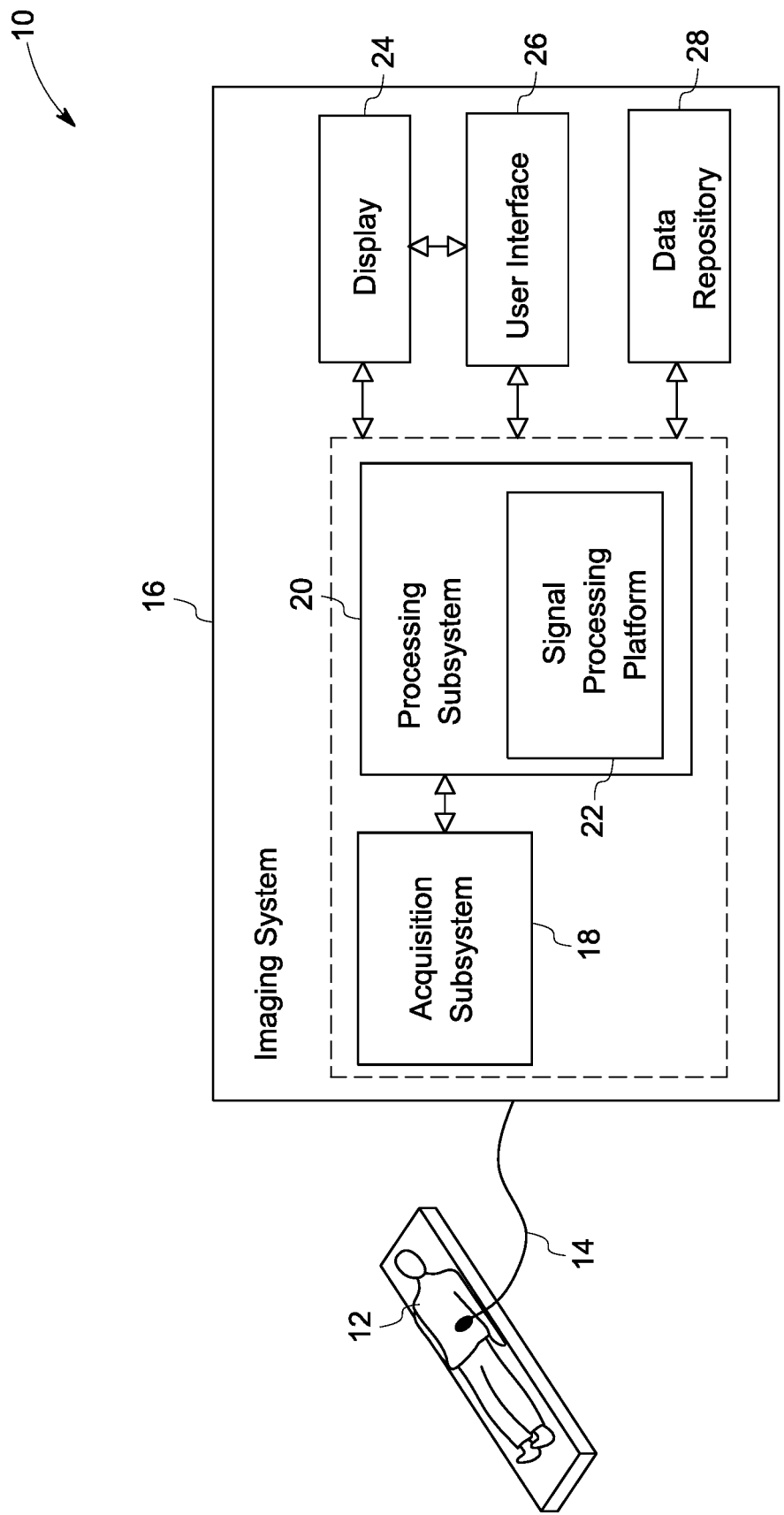
FIG. 1 is a block diagram of an exemplary diagnostic system, in accordance with aspects of the present technique.

FIG. 1 is a block diagram of an exemplary diagnostic system 10 for processing data signals. In the present configuration, the system 10 may be configured to process image data, in accordance with aspects of the present technique. The system 10 may be configured to acquire image data from an object or a patient 12 via an image acquisition device 14. Although the present technique is described with reference to image data, it may be noted that the present technique may also find application with other data signals, such as, but not limited to, audio signals, video signals, and the like. In one embodiment, the image acquisition device 14 may include a probe, where the probe may include an invasive probe, or a non-invasive or external probe, such as an external ultrasound probe, that is configured to aid in the acquisition of image data. Also, in certain other embodiments, image data may be acquired via one or more sensors (not shown) that may be disposed on the object or the patient 12. By way of example, the sensors may include physiological sensors such as electrocardiogram (ECG) sensors and/or positional sensors such as electromagnetic field sensors or inertial sensors. These sensors may be operationally coupled to a data acquisition device, such as an imaging system, via leads, for example. Alternatively, the image acquisition device 14 may include detectors, in certain other embodiments.

The system 10 may also include an imaging system 16 that is in operative association with the image acquisition device 14. Although the present example is described in terms of a medical imaging system, the present technique may also find application in other areas, such as, but not limited to industrial imaging systems and non-destructive evaluation and inspection systems, such as pipeline inspection systems and liquid reactor inspection systems. Additionally, the exemplary embodiments illustrated and described hereinafter may find application in multi-modality imaging systems that employ CT scanning and/or MR imaging in conjunction with other imaging modalities, position-tracking systems or other sensor systems.

In a presently contemplated configuration, the imaging system 16 may include an acquisition subsystem 18 and a processing subsystem 20. Further, the acquisition subsystem 18 of the imaging system 16 may be configured to acquire image data representative of one or more anatomical regions in the patient 12 via the image acquisition device 14. The image data acquired from the patient 12 may then be processed by the processing subsystem 20.

Additionally, the image data acquired and/or processed by the medical imaging system 16 may be employed to aid a clinician in identifying disease states, assessing need for treatment, determining suitable treatment options, and/or monitoring the effect of treatment on the disease states. In certain embodiments, the processing subsystem 20 may also be coupled to a storage system, such as a data repository 28, where the data repository 28 may be configured to receive and store image data.

In accordance with exemplary aspects of the present technique, the processing subsystem 20 may include a signal processing platform 22 that is configured to process the acquired image data to reconstruct an image. The signal processing platform 22 may also be configured to generate a plurality of coefficients associated with the acquired image data. Furthermore, the term "coefficient" is used herein in connection with the wavelet or any other suitable transformation component corresponding to the acquired image data. As used herein, the term "thresholded coefficients" may be used to refer to coefficients that are selected from a set of wavelet coefficients corresponding to the acquired image data by using a thresholding operation. The thresholding operation, for example, may include hard thresholding, soft thresholding, or a combination thereof. Moreover, the signal processing platform 22 may also be configured to facilitate reconstruction of an image using the plurality of coefficients. The determination of the plurality of coefficients and reconstruction of the image using the plurality of coefficients will be explained in greater detail with reference to FIGS. 3-5.

Further, as illustrated in FIG. 1, the imaging system 16 may also include a display 24 and a user interface 26. However, in certain embodiments, such as in a touch screen, the display 24 and the user interface 26 may overlap. Also, in some embodiments, the display 24 and the user interface 26 may include a common area. In accordance with aspects of the present technique, the display 24 of the medical imaging system 16 may be configured to display an image generated by the imaging system 16 based on the image data acquired via the image acquisition device 14 and processed by the processing subsystem 20. Additionally, in accordance with further aspects of the present technique, the reconstructed image generated subsequent to processing of the acquired image data by the signal processing platform 22 may also be visualized on the display 24.

In addition, the user interface 26 of the imaging system 16 may include a human interface device (not shown) configured to facilitate users in manipulating the image data displayed on the display 24. The human interface device may include a mouse-type device, a trackball, a joystick, a stylus, or a touch screen configured to aid the users in the identification of the one or more regions of interest, for instance. However, other human interface devices, such as, but not limited to, a touch screen, may also be employed. Furthermore, in accordance with aspects of the present technique, the user interface 26 may be configured to aid the users in navigating through the images acquired, reconstructed or generated by the imaging system 16. Additionally, the user interface 26 may also be configured to aid in manipulating and/or organizing the reconstructed images displayed on the display 24.

Figure 2:
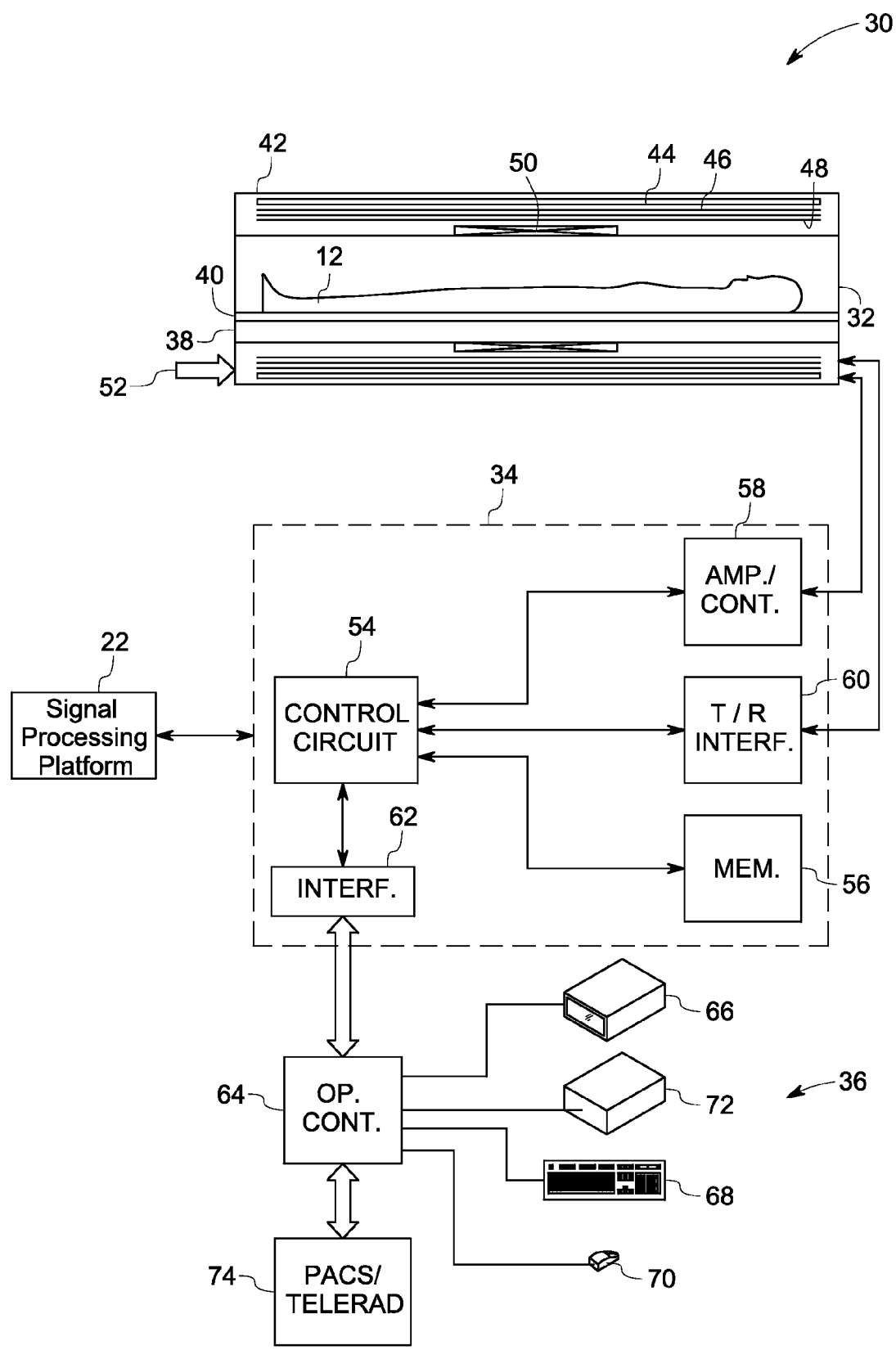
FIG. 2 is a block diagram illustrating an embodiment of an imaging system for use in the diagnostic system of FIG. 1, in accordance with aspects of the present technique.

As noted with reference to FIG. 1, the imaging system 16 may include a Magnetic Resonance Imaging System (MRI), a Computed Tomography (CT) Imaging System, a Positron Emission Tomography (PET), Single Photon Emission Computed Tomography (SPECT) Imaging System, or combinations thereof. In a presently contemplated configuration, the imaging system 16 may include an MR imaging system. Referring now to FIG. 2, a diagrammatical view of an exemplary magnetic resonance imaging (MRI) system 30, in accordance with aspects of the present technique, is depicted. The MRI system 30 is illustrated diagrammatically as including a scanner 32, scanner control circuitry 34 and system control circuitry 36. While the MRI system 30 may include any suitable MRI scanner or detector, in the illustrated embodiment the MRI system 30 is shown as including a full body scanner including a patient bore 38 into which a table 40 may be positioned to place a subject, such as the patient 12 (see FIG. 1) in a desired position for scanning. The scanner 32 may be of any suitable type of rating, including scanners varying from 0.5 Tesla ratings to 1.5 Tesla ratings and beyond. Also, the subject need not be a patient such as a person or animal, but may include other objects, such as baggage, for example.

Additionally, the scanner 32 may include a series of associated coils for producing controlled magnetic fields, for generating radio-frequency (RF) excitation pulses, and for detecting emissions from gyromagnetic material within the patient 12 in response to such pulses. In the diagrammatical view of FIG. 2, a primary magnet coil 42 may be provided for generating a primary magnetic field generally aligned with the patient bore 38. A series of gradient coils 44, 46 and 48 may be grouped in a coil assembly for generating controlled magnetic gradient fields during examination sequences. A RF coil 50 may be provided for generating RF pulses for exciting the gyromagnetic material.

In a presently contemplated configuration, the gradient coils 44, 46 and 48 may have different physical configurations adapted to their function in the MRI system 30. The gradient coils 44, 46 and 48 include conductive wires, bars or plates that are wound or cut to form a coil structure that generates a gradient field upon application of control pulses as described below. The placement of the coils within the gradient coil assembly may be done in several different orders. In one embodiment, a Z-axis coil may be positioned at an innermost location, and may be formed generally as a solenoid-like structure that has relatively little impact on the RF magnetic field. Thus, in the illustrated embodiment, the gradient coil 48 is the Z-axis solenoid coil, while the coils 44 and 46 are Y-axis and X-axis coils, respectively.

The coils of the scanner 32 may be controlled by external circuitry to generate desired fields and pulses, and to read signals from the gyromagnetic material in a controlled manner. It may be noted that, when the material, typically bound in tissues of the patient 12, is subjected to the primary field, individual magnetic moments of the paramagnetic nuclei in the tissue partially align with the field. While a net magnetic moment is produced in the direction of the polarizing field, the randomly oriented components of the moment in a perpendicular plane generally cancel one another. During an examination sequence, a RF frequency pulse is generated at or near the Larmor frequency of the material of interest, resulting in rotation of the net aligned moment to produce a net transverse magnetic moment. This transverse magnetic moment precesses around the main magnetic field direction, emitting RF signals that are detected by the scanner 32 and processed for reconstruction of the desired image.

Furthermore, the gradient coils 44, 46 and 48 may be configured to facilitate generation of precisely controlled magnetic fields, the strength of which vary over a predefined field of view, typically with positive and negative polarity. When each coil is energized with known electric current, the resulting magnetic field gradient is superimposed over the primary field and produces a desirably linear variation in the Z-axis component of the magnetic field strength across the field of view. The field varies linearly in one direction, but is homogenous in the other two. The three coils have mutually orthogonal axes for the direction of their variation, enabling a linear field gradient to be imposed in an arbitrary direction with an appropriate combination of the three gradient coils.

Moreover, the pulsed gradient fields perform various functions integral to the imaging process. Some of these functions are slice selection, frequency encoding and phase encoding. These functions may be applied along the X-axis, Y-axis and Z-axis of the original coordinate system or along other axes determined by combinations of pulsed currents applied to the individual field coils.

Also, the slice select gradient determines a slab of tissue or anatomy to be imaged in the patient 12. The slice select gradient field may be applied simultaneously with a frequency selective RF pulse to excite a known volume of spins within a desired slice that precess at the same frequency. The slice thickness is determined by the bandwidth of the RF pulse and the gradient strength across the field of view.

The frequency encoding gradient is also known as the readout gradient, and is usually applied in a direction perpendicular to the slice select gradient. In general, the frequency encoding gradient is applied before and during the formation of the MR echo signal resulting from the RF excitation. Spins of the gyromagnetic material under the influence of this gradient are frequency encoded according to their spatial position along the gradient field. By Fourier transformation, acquired signals may be analyzed to identify their location in the selected slice by virtue of the frequency encoding.

Finally, the phase encode gradient is generally applied before the readout gradient and after the slice select gradient. Localization of spins in the gyromagnetic material in the phase encode direction may be accomplished by sequentially inducing variations in phase of the precessing protons of the material using slightly different gradient amplitudes that are sequentially applied during the data acquisition sequence. The phase encode gradient permits phase differences to be created among the spins of the material in accordance with their position in the phase encode direction.

In addition, a great number of variations may be devised for pulse sequences employing the exemplary gradient pulse functions described hereinabove as well as other gradient pulse functions not explicitly described here. Moreover, adaptations in the pulse sequences may be made to appropriately orient both the selected slice and the frequency and phase encoding to excite the desired material and to acquire resulting MR signals for processing.

The coils of the scanner 32 are controlled by the scanner control circuitry 34 to generate the desired magnetic field and RF pulses. In the diagrammatical view of FIG. 2, the control circuitry 34 is shown as including a control circuit 54 for commanding the pulse sequences employed during the examinations, and for processing received signals. The control circuit 54 may include any suitable programmable logic device, such as a CPU or digital signal processor of a general purpose or application-specific computer. Also, the scanner control circuitry 34 may further include memory circuitry 56, such as volatile and non-volatile memory devices for storing physical and logical axis configuration parameters, examination pulse sequence descriptions, acquired image data, programming routines, and so forth, used during the examination sequences implemented by the scanner.

Interface between the control circuit 54 and the coils of the scanner 32 is managed by amplification and control circuitry 58 and by transmission and receive interface circuitry 60. The amplification and control circuitry 58 includes amplifiers for each gradient field coil to supply drive current to the field coils in response to control signals from the control circuit 54. The transmit/receive (T/R) interface circuitry 60 includes additional amplification circuitry for driving the RF coil 50. Moreover, where the RF coil 50 serves both to emit the RF excitation pulses and to receive MR signals, the T/R circuitry 60 may typically include a switching device for toggling the RF coils 50 between active or transmitting mode, and passive or receiving mode. A power supply, denoted generally by reference numeral 52 in FIG. 2, is provided for energizing the primary magnet coil 42. Finally, the scanner control circuitry 34 may include interface components 62 for exchanging configuration and image data with the system control circuitry 36. It should be noted that, while in the present description reference is made to a horizontal cylindrical bore imaging system employing a superconducting primary field magnet assembly, the present technique may be applied to various other configurations, such as scanners employing vertical fields generated by superconducting magnets, permanent magnets, electromagnets or combinations of these means.

The system control circuitry 36 may include a wide range of devices for facilitating interface between an operator or radiologist and the scanner 32 via the scanner control circuitry 34. In the illustrated embodiment, for example, an operator controller 64 is provided in the form of a computer workstation employing a general purpose or application-specific computer. The workstation also typically includes memory circuitry for storing examination pulse sequence descriptions, examination protocols, user and patient data, image data, both raw and processed, and so forth. Further, the workstation may further include various interface and peripheral drivers for receiving and exchanging data with local and remote devices. In the illustrated embodiment, such devices include a conventional computer keyboard 68 and an alternative input device such as a mouse 70. A printer 72 may be provided for generating hard copy output of documents and images reconstructed from the acquired data. Moreover, a computer monitor 66 may be provided for facilitating operator interface. In addition, the system 30 may include various local and remote image access and examination control devices, represented generally by reference numeral 74 in FIG. 2. Such devices may include picture archiving and communication systems (PACS), teleradiology systems, and the like.

The MRI system 30 further includes a signal processing platform, such as the signal processing platform 22 (see FIG. 1). In a presently contemplated configuration, the signal processing platform 22 is shown as being in operative association with the scanner control circuitry 34. In certain embodiments, the signal processing platform 22 may be a component of the scanner control circuitry 34. In one embodiment, the signal processing platform 22 may be configured to process the MR signals to generate a plurality of coefficients associated with the acquired image data corresponding to each MR signal. In still another embodiment, the signal processing platform 22 may be configured to reconstruct images utilizing the MR signals, where each image corresponds to an MR signal. In yet another embodiment, the signal processing platform 22 may be configured to reconstruct an image utilizing the plurality of coefficients corresponding to each MR signal, where each reconstructed image corresponds to a MR signal. The processing of MR signals to generate a plurality of coefficients and reconstruction of an image utilizing the plurality of coefficients will be described in greater detail with reference to FIGS. 3-5.

Figure 3:
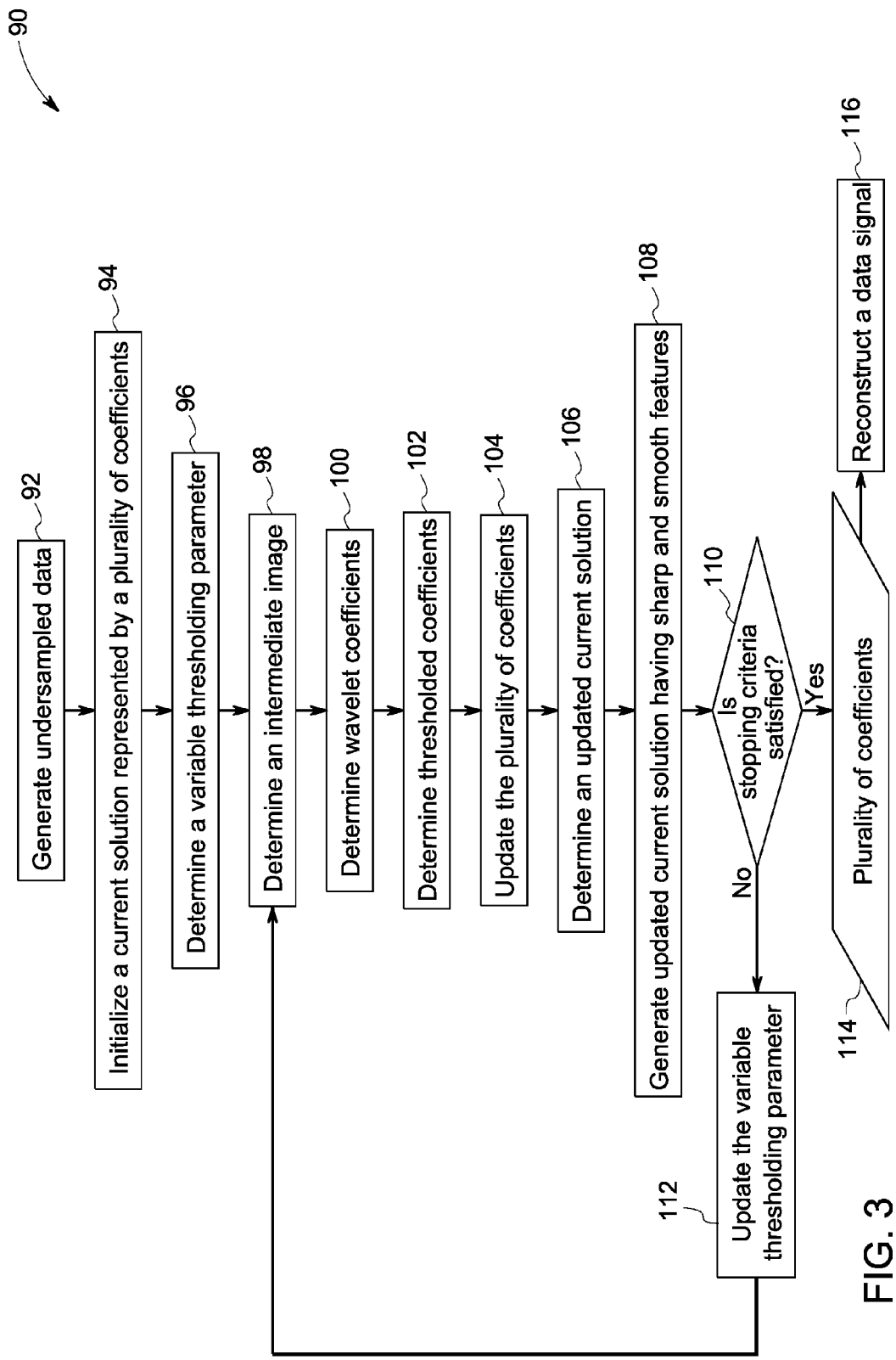
FIG. 3 is a flow chart illustrating an exemplary signal processing method, in accordance with aspects of the present technique.

Turning now to FIG. 3, a flow chart 90 illustrating an exemplary signal processing method, in accordance with aspects of the present technique, is depicted. Although the method for processing data signals described in FIG. 3 is described with reference to processing of image signals, it will be appreciated that the signal processing method may also find application in processing of video signals, audio signals, and the like.

The method starts at step 92, where undersampled data may be generated. As used herein, the term "undersampled data" may be used to refer to a measured data signal in which a number of sample points acquired is less than those required by Nyquist's sampling theorem to match a desired image/signal quality metrics, such as, resolution of the desired image/signal, field of view, and the like. Hereinafter, the terms "undersampled data" and "undersampled data signal" may be used interchangeably. The undersampled data signal, for example, may be generated by the imaging system 16, (see FIG. 1) and more particularly by the acquisition subsystem 18 (see FIG. 1). Moreover, in one embodiment, the undersampled data signal may be generated by randomly down-selecting data sample locations. By way of example, the random down-selection, for example, may include a uniform random order data selection, utilization of probability density functions, or combinations thereof.

Subsequently, as indicated by step 94, a current solution represented by a plurality of coefficients may be initialized. As used herein, the term "current solution" may be used to refer to an estimate of a desired image of an object. Further, as used herein, the term "desired image/signal" may be used to refer to a resultant image corresponding to an object that is reconstructed using the present technique.

Moreover, in certain embodiments, the initialized current solution may be initialized to zero so that the plurality of coefficients is also initialized to zero. In one embodiment, the current solution may be initialized automatically by the imaging system 16. In another embodiment, the current solution may be initialized manually by a user via use of the imaging system 16, the user interface 26 and the display device 24. Also, in one embodiment, the plurality of coefficients may include a list of coefficients. Accordingly, at step 94, in certain embodiments, the list of coefficients may be initialized to zero.

In accordance with exemplary aspects of the present technique, a plurality of coefficients may be generated to facilitate reconstruction of a data signal. Accordingly, at step 96, a variable thresholding parameter may be determined. As used herein, the term "variable thresholding parameter" may be used to refer to a parameter value, which may be varied to determine thresholded coefficients from wavelet coefficients corresponding to the acquired data signal. Also, the term "thresholded coefficients" may be used to refer to wavelet coefficients that are constrained by the variable thresholding parameter. More particularly, the thresholded coefficients may include coefficients that may be used in reconstruction of a data signal. This data signal may subsequently be used for reconstruction of a resultant image.

Subsequent to generating the undersampled data at step 92 and initializing the current solution at step 94, an intermediate image data set may be determined at step 98. As used herein, the term "intermediate image data set" may be used to refer to an intermediate image that may be further used for reconstructing the desired image. In one embodiment, the intermediate image data set may be determined by the imaging system 16. Hereinafter, the terms "intermediate image" and "intermediate image data set" may be used interchangeably. The determination of the intermediate image in accordance with one aspect of the present technique may be better understood with reference to FIG. 4. Similarly, an alternate method of determining the intermediate image in accordance with another aspect of the present technique may be better understood with reference to FIG. 5.

Figure 4:
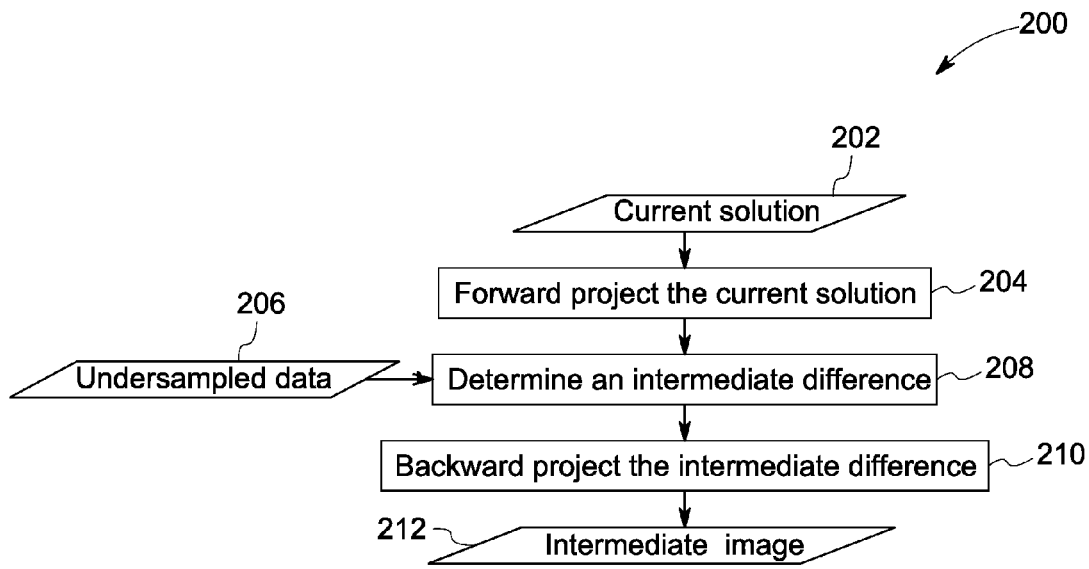
FIG. 4 is a flow chart illustrating an exemplary method of determining an intermediate image, in accordance with aspects of the present technique.

Referring now to FIG. 4, a flow chart 200 illustrating an exemplary method of determining an intermediate image in accordance with aspects of the present technique, is depicted. In other words, step 98 of FIG. 3 is illustrated in greater detail in FIG. 4. Further, in certain embodiments, the intermediate image may be determined by the imaging system 16, and more particularly the signal processing platform 22 (see FIG. 1).

Reference numeral 202 may be representative of a current solution. In one embodiment, the current solution may include the initialized current solution determined at step 94 of FIG. 3. Further, at step 204, the current solution 202 may be forward projected, thereby resulting in a forward projected current solution. In certain embodiments, the forward projection of the current solution 202 may further include undersampling of the forward projected current solution. The undersampling of the forward projected current solution, for example, may include undersampling the forward projected current solution at locations substantially similar to the undersampled locations of undersampled data 206. The undersampled data 206, for example, may be similar to the undersampled data obtained at step 92 of FIG. 3. Subsequent to the determination of the forward projected current solution, an intermediate difference may be determined, as indicated by step 208. In one embodiment, the intermediate difference may be determined by utilizing the forward projected current solution and the undersampled data 206. More particularly, the intermediate difference may be determined by subtracting the forward projected current solution from the undersampled data 206.

Subsequent to the determination of the intermediate difference, the intermediate difference may be backward projected, as depicted by step 210. Consequent to the backward projection of the intermediate difference, an intermediate image 212 may be obtained. While FIG. 4 illustrates one embodiment of a method for determining an intermediate image, such as, the intermediate image 212, an alternative embodiment of a method for determining the intermediate image will be described with reference to FIG. 5.

Figure 5:
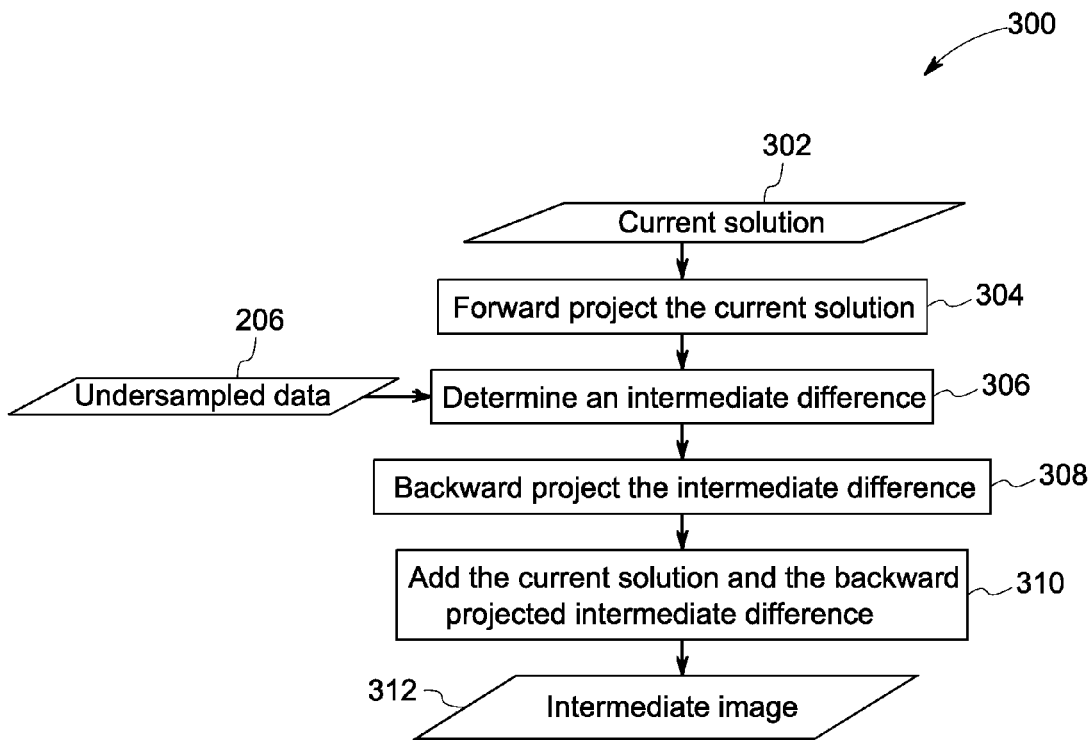
FIG. 5 is a flow chart illustrating an alternative method of generating intermediate image, in accordance with aspects of the present technique.

Turning now to FIG. 5, a flow chart 300 illustrating an alternative method of generating an intermediate image, in accordance with aspects of the present technique, is depicted. More particularly, step 98 of FIG. 3 for determination of an intermediate image in accordance with one aspect of the present technique is illustrated in greater detail in FIG. 5. As previously noted, in certain embodiments, the intermediate image may be determined by the imaging system 16, and more particularly by the signal processing platform 22.

Reference numeral 302 may be representative of a current solution. In one embodiment, the current solution 302 may include the initialized current solution determined at step 94 of FIG. 3. Further, at step 304, the current solution 302 may be forward projected thereby resulting in a forward projected current solution. In certain embodiments, the forward projection of the current solution 302 may further include undersampling of the forward projected current solution. The undersampling of the forward projected current solution, for example, may include undersampling the forward projected current solution at locations substantially similar to the undersampled locations of the undersampled data 206 (see FIG. 4). Further to the determination of the forward projected current solution, an intermediate difference may be determined at step 306. Here again, as previously noted with reference to FIG. 4, the intermediate difference may be determined by utilizing the forward projected current solution and the undersampled data 206. More particularly, the intermediate difference may be determined by subtracting the forward projected current solution from the undersampled data 206.

Subsequently at step 308, a backward projection of the intermediate difference generated at step 306 may be determined resulting in a backward projected intermediate difference. Further to determination of the backward projected intermediate difference at step 308, the current solution 302 may be added with the backward projected intermediate difference as indicated by step 310. Subsequent to processing of step 310, an intermediate image 312 may be generated. More particularly, reference numeral 312 is representative of an intermediate image where the current solution 302 has been added to the backward projected intermediate difference. Consequent to the addition of the current solution 302 with the backward projected intermediate difference, the intermediate image 312 may be obtained.

With returning reference to FIG. 3, at step 100, wavelet coefficients corresponding to the intermediate image may be determined. More particularly, at step 100, the wavelet coefficients may be determined by applying a transformation technique to the intermediate image, wherein the transformation technique, for example, may include a wavelet transformation technique, a gradient transformation technique, and the like. The intermediate image, for example, may include the intermediate image 212 (see FIG. 4), or the intermediate image 312 (see FIG. 5).

Furthermore in accordance with aspects of the present technique, the wavelet coefficients determined at step 100 may be used to determine thresholded coefficients, as indicated by step 102. In certain embodiments, the thresholded coefficients may be determined by applying a thresholding operation on the wavelet coefficients. As previously noted, the thresholding operation, for example, may include a hard thresholding operation, a soft thresholding operation, or a combination thereof. In accordance with aspects of the present technique, the thresholding operation determines the thresholded coefficients by utilizing the variable thresholding parameter determined at step 96. As previously noted, a value of the variable thresholding parameter may be varied to facilitate determination of the thresholded coefficients from the wavelet coefficients. More particularly, in certain embodiments, the variable thresholding parameter may be configured to vary its value via use of a thresholding update factor. For example, if s is a thresholding update factor, then $\lambda(s)$ may be representative of a variable thresholding parameter. Furthermore, in certain embodiments, the thresholding update factor, such as, the thresholding update factor s may be dependent on a statistical distribution of the wavelet coefficients, an estimated noise present in the undersampled data, or a combination thereof.

Following the determination of the thresholded coefficients at step 102, the plurality of coefficients may be updated, as indicated by step 104. More particularly, at step 104, the thresholded coefficients determined at step 102 may be appended to the plurality of coefficients to update the plurality of coefficients. Subsequent to the updation of plurality of coefficients at step 104, the current solution may be updated at step 106, thereby resulting in an updated current solution. In one embodiment, the updated current solution may be obtained by updating the current solution initialized at step 94. As previously noted with reference to FIGS. 4-5, the current solution may be the current solution 202 (see FIG. 4) or the current solution 302 (see FIG. 5), for example. Furthermore, the current solution may be the current solution initialized at step 94.

In accordance with exemplary aspects of the present technique, the method for updating the current solution, as indicated by step 106, is dependent on the method employed for determination of the intermediate image at step 98. As previously noted, the intermediate image, for example, includes the intermediate image 212 (see FIG. 4) or the intermediate image 312 (see FIG. 5). The method for updating the current solution 202 (see FIG. 4) based upon the method used for determining the intermediate image 212 may be better understood with reference to FIG. 6. Similarly, the method for updating the current solution 302 (see FIG. 5) based upon the method used for determining the intermediate image 312 may be better understood with reference to FIG. 7.

Figure 6:
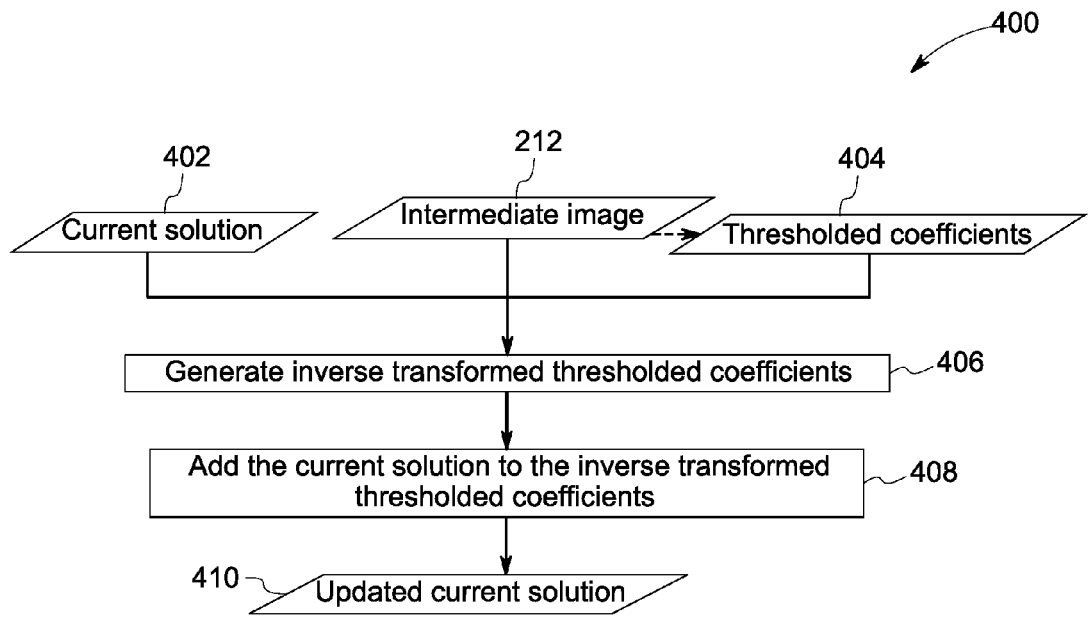
FIG. 6 is a flow chart illustrating an exemplary method of updating a current solution, in accordance with aspects of the present technique.

Referring now to FIG. 6, a flow chart 400 illustrating an exemplary method of updating a current solution in accordance with aspects of the present technique, is depicted. More particularly, the processing of step 106 of FIG. 3 is presented in greater detail. As previously noted, the method for updating the current solution may be dependent on the method employed for determining the intermediate image. Accordingly, FIG. 6 is illustrative of the updation of the current solution based upon the method used for determining the intermediate image described with reference to FIG. 4. Specifically, FIG. 6 describes the method for updating the current solution where the intermediate image includes the intermediate image 212 (see FIG. 4).

Reference numeral 402 may be representative of a current solution, and reference numeral 404 may be representative of thresholded coefficients. In one embodiment, the thresholded coefficients 404 may include thresholded coefficients corresponding to the current solution 402. Specifically, the thresholded coefficients 404, may include the thresholded coefficients determined at step 102 of FIG. 3 that are generated using the intermediate image 212. Similarly, in certain embodiments, the current solution 402 may be the current solution 202 (see FIG. 4).

Further, the method starts at step 406 where an inverse transformation of the thresholded coefficients 404 may be determined. Consequent to processing at step 406, inverse transformed thresholded coefficients may be generated. Subsequently, at step 408, the current solution 402 may be added to the inverse transformed thresholded coefficients at step 408. Consequent to the addition of the current solution 402 to the inverse transformed thresholded coefficients at step 408, an updated current solution 410 may be obtained.

Figure 7:
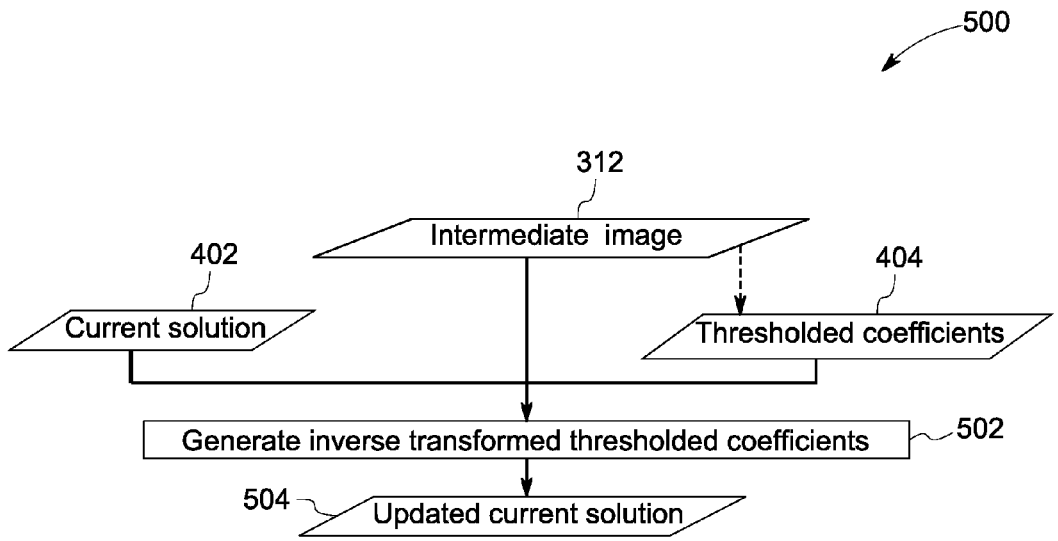
FIG. 7 is a flow chart illustrating an alternative method of updating a current solution, in accordance with aspects of the present technique.

In accordance with aspects of the present technique, an alternative method for updating the current solution is presented. FIG. 7 is a flow chart 500 illustrating an alternative method of updating a current solution, in accordance with aspects of the present technique. More particularly, the processing of step 106 of FIG. 3 where the updation of the current solution is based upon the intermediate image 312 (see FIG. 5), is depicted. Reference numeral 402 may be representative of the current solution and reference numeral 404 may be representative of thresholded coefficients. The thresholded coefficients 404, for example, may be corresponding thresholded coefficients of the current solution 402. The thresholded coefficients, for example, may include the thresholded coefficients determined at step 102 of FIG. 3 that are generated using the intermediate image 312. Similarly, in certain embodiments, the current solution 402 may be similar to the current solution 302 (see FIG. 5). The method starts at step 502, where an inverse transformation of the thresholded coefficients 404 may be determined. Accordingly, inverse transformed thresholded coefficients may be generated. Consequent to the inverse transformation of the thresholded coefficients at step 502, an updated current solution 504 may be obtained.

With returning reference to FIG. 3, at step 108, in accordance with exemplary aspects of the present technique, the updated current solution determined at step 106 may be processed to preserve smooth and sharp features in the updated current solution. Moreover, the processing of step 108 facilitates retaining the smooth and sharp features in a resultant image reconstructed using the present technique. It may be noted that in certain embodiments, the implementation of step 108 may be optional. The method for preserving the smoothness and sharpness in the updated current solution may be better understood with reference to FIG. 8.

Figure 8:
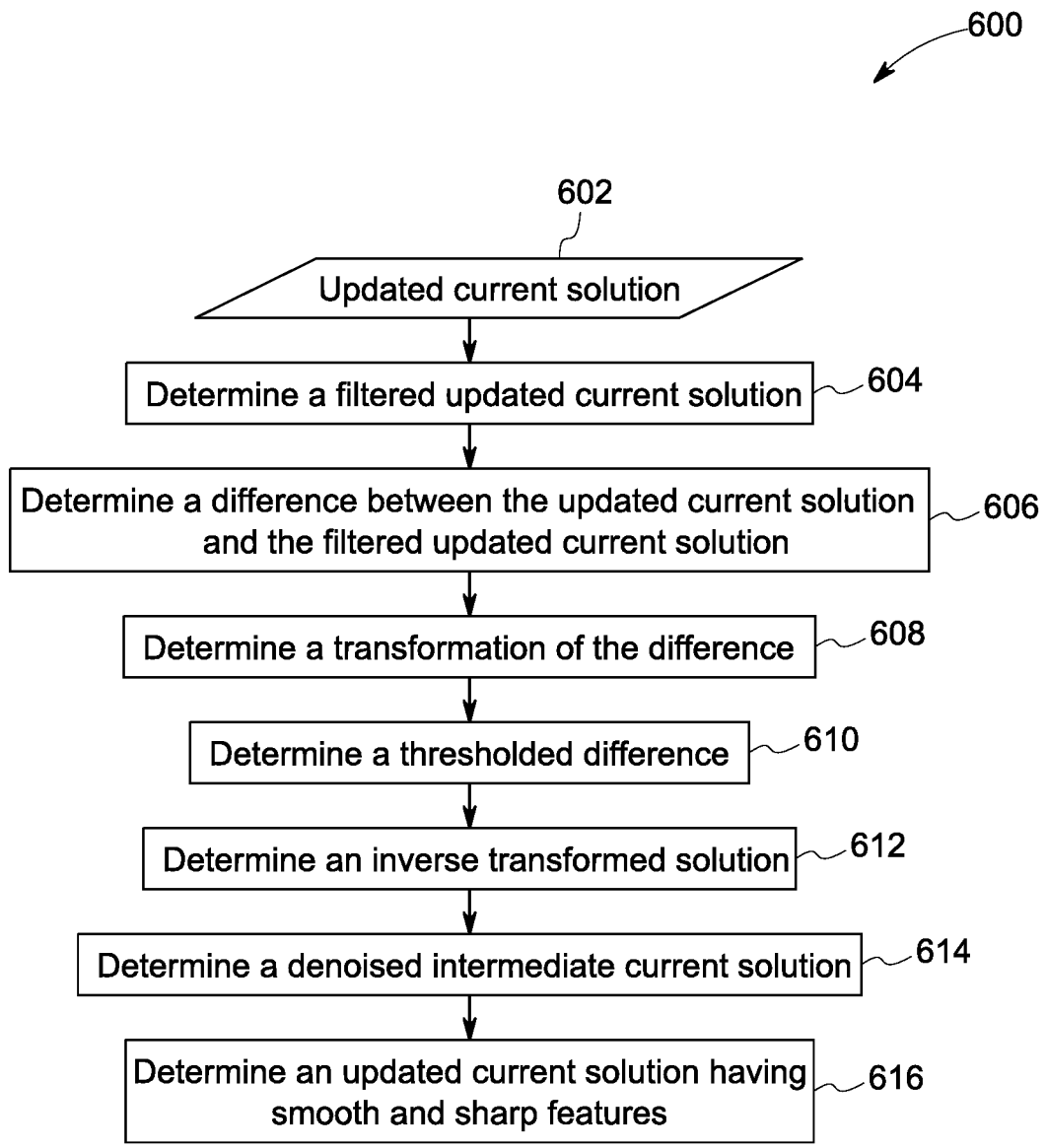
FIG. 8 a flow chart illustrating an exemplary method for preserving smoothness and sharpness of an updated current solution, in accordance with aspects of the present technique.

Turning now to FIG. 8, a flow chart 600 illustrating an exemplary method for preserving smoothness and sharpness of an updated current solution, in accordance with aspects of the present technique, is depicted. Specifically, step 108 of FIG. 3 is described in greater detail in FIG. 8. More particularly, a method for retaining smooth and sharp features in a resultant image reconstructed utilizing the present technique is described with reference to FIG. 8.

As illustrated in FIG. 8, reference numeral 602 may be representative of an updated current solution. The updated current solution, for example, may include the updated current solution determined at step 106 of FIG. 3. The method starts at step 604 where a filtered updated current solution may be generated. In one embodiment, the filtered updated current solution may be generated by filtering the updated current solution 602. The updated current solution 602, for example, may be filtered by using a median filter, a window filter, and the like.

Subsequent to the determination of the filtered updated current solution at step 604, a difference between the updated current solution 602 and the filtered updated current solution may be determined, as indicated by step 606. Furthermore, at step 608, a transformation of the difference may be determined, thereby resulting in a transformed difference. The transformation of the difference, for example, may include a gradient transformation, a wavelet transformation, or the like.

Additionally, at step 610, a thresholded difference may be determined by applying a thresholding operation on the transformed difference determined at step 608. The thresholding operation, for example, may be applied by using the variable thresholding parameter determined using a method similar to step 96 (see FIG. 3). In certain embodiments, the thresholding operation, for example, may include a hard thresholding operation, a soft thresholding operation, or a combination thereof.

Furthermore, at step 612, an inverse transformation may be determined. More particularly, at step 612, an inverse transformation of the thresholded difference generated at step 610 may be determined via application of an inverse transformation resulting in an inverse transformed solution. The inverse transformation method used at step 612 for determining the inverse transformation may be inverse to the transformation method used at step 608. For example, if a wavelet transformation is used at step 608, then an inverse wavelet transformation may be used at step 612. Subsequently at step 614, a denoised intermediate current solution may be determined. More particularly, the denoised intermediate current solution may be determined by adding the filtered updated current solution determined at step 604 to the inverse transformed solution determined at step 612.

Moreover, at step 616, an updated current solution having smooth and sharp features may be determined by adding a first multiple of the denoised intermediate current solution determined at step 614 and a second multiple of the updated current solution 602. In one embodiment, the updated current solution 602 may include the updated current solution determined at step 108 of FIG. 3. Further, in certain embodiments, the first multiple of the denoised intermediate current solution may be determined by computing a product of a first variable and the denoised intermediate current solution determined at step 614. Similarly, the second multiple of the updated current solution 602 may be determined by computing a product of a second variable and the updated current solution 602. In one embodiment, the value of the first variable and the second variable may be in the range from about 0 to about 1. In still another embodiment, the value of the first variable and the second variable may be selected such that a sum of the first variable and the second variable is equal to one. For example, if $\alpha$ is representative of the first variable, and $\alpha'$ is representative of the second variable, then a value of $\alpha$ may be selected such that a sum of the first variable $\alpha$ and the second variable $\alpha'$ will be equal to one (for example, $\alpha+\alpha'=1$). In one embodiment, the selection of the $\alpha$ and $\alpha'$ may lead to determination of a quantitatively accurate updated current solution having smooth and sharp features determined by the processing of step 616.

Moreover, in accordance with exemplary aspects of the present technique, further to the determination of the updated current solution and/or the updated current solution having smooth and sharp features, a check may be carried out to verify if a desired solution is obtained. In one embodiment, a stopping criteria may be used to determine if the desired solution is obtained. With returning reference to FIG. 3, a check may be carried out at step 110 to verify if the desired solution is obtained by determining if the stopping criteria is satisfied. In one embodiment, the verification of the stopping criteria may include determining if a norm difference of the undersampled data obtained at step 92 and a forward projection of the updated current solution generated at step 106 is less than a determined value. In still another embodiment, the stopping criteria may include determining if a norm difference of the undersampled data generated at step 92 and a forward projection of the updated current solution having smooth and sharp features determined at step 108 is less than a determined value. The norm, for example, may include a L1-norm or a L2-norm.

Furthermore, at step 110, if it is determined that the stopping criteria is not satisfied then the variable thresholding parameter may be updated, as indicated by step 112. The updation of the variable thresholding parameter may lead to another iteration, that is, repetition of the processing of steps 98-110. As previously noted, the variable thresholding parameter may be updated by using a thresholding update factor. The thresholding update factor, for example, may be dependent on the iteration number, a composition of the updated current solution, the updated current solution having sharp and smooth features, a composition of the undersampled data, or combinations thereof. Additionally, in certain embodiments, the thresholding update factor may, for example, include a factor, a multiple, a square, a square root, an absolute of the thresholding update factor, or combinations thereof. Further to the updation of the variable thresholding parameter, control may be transferred to step 98, which leads to iteration of the steps 98-108. Accordingly, at step 98 the intermediate image may be determined by using the updated current solution or the updated current solution having smooth and sharp features. In other words, the steps 98-108 may be iterated till the stopping criteria is satisfied at step 110.

By way of example, at the $n^{th}$ iteration, if it is determined that the stopping criteria is not satisfied, then the updated current solution corresponding to the $n^{th}$ iteration may be used for processing steps 98-108 corresponding to the $(n+1)^{th}$ iteration. More particularly, the updated current solution corresponding to the $n^{th}$ iteration may be used to determine an intermediate image (step 98), determine the wavelet coefficients corresponding to the intermediate image (step 100), determine the thresholded coefficients (step 102), and update the plurality of coefficients (step 104) in the $(n+1)^{th}$ iteration. Subsequently, the updated plurality of coefficients may be employed to determine an updated current solution (step 106) corresponding the $(n+1)^{th}$ iteration. In accordance with exemplary aspects of the present technique, the updated current solution determined at step 106 in one iteration may be used to update the plurality of coefficients and determine an updated current solution in a subsequent iteration. In a similar fashion, in another embodiment, in each iteration an updated current solution having smooth and sharp features may be used to determine the thresholded coefficients to update the plurality of coefficients and update the updated current solution having smooth and sharp features. Furthermore, in each iteration, the variable thresholding parameter may be varied to constrain the wavelet coefficients.

With continued reference to step 110, if it is verified that the stopping criteria is satisfied, then it may be deduced that a plurality of coefficients 114 has been determined. More particularly, at step 110 if it is verified that the stopping criteria is satisfied, it is indicative of determination of all the possible thresholded coefficients and inclusion of all the thresholded coefficients in the plurality of coefficients 114. Consequent to the determination of the plurality of coefficients 114, a data signal may be reconstructed at step 116. More particularly, at step 116, the data signal may be reconstructed by utilizing the plurality of coefficients 114.

As noted hereinabove, the present technique may find application in processing of various data signals such as, but not limited to, audio signals, video signals, image data signals, and the like. The signal processing method illustrated in FIG. 3 may be better understood by application of the present technique to an image data signal. The reconstruction of an image by application of the exemplary signal processing method to an acquired data signal is described hereinafter. The undersampled data signal may be used to reconstruct an image signal g. An image signal g to be reconstructed having N pixels may be represented as depicted in equation (1):

$$g = \sum_{n=0}^{N-1} \alpha_n \phi_n \quad (1)$$

where $\alpha_n$ is representative of a thresholded coefficient corresponding to a wavelet $\phi_n$.

Further, as previously described with reference to FIG. 3, an undersampled data signal x may be generated by randomly down-selecting sample points of a data signal. The random down-selection, for example, may include uniform random order data selection, utilization of probability density functions, or combinations thereof. The undersampled data signal x may be representative of a forward projection of the image to be reconstructed to the data space. Thus, if d is representative of a desired image to be reconstructed, then in one embodiment, the undersampled data x may be represented as follows:

$$x = Pd \quad (2)$$

where P is representative of a forward projection operation having restriction of the forward projection to random downsampling locations where data is measured. The undersampled data x, for example, may include realistic measurement in addition to some noise.

Further, as previously described with reference to step 94 of FIG. 3, initially a current solution $f^0$ may be initialized which may be represented by a plurality of coefficients L. In certain embodiments, the initialized current solution $f^0$ may be equivalent to zero so that the initialized plurality of coefficients L may also include all its entries as zero.

Subsequently as described in detail with reference to FIGS. 3-5, an intermediate image is determined. The intermediate image, for example, may include the intermediate image 212 (see FIG. 4) or the intermediate image 312 (see FIG. 5). If I is representative of the intermediate image 212, then I may be determined as follows:

$$I = P^H(x - P(f^0)) \quad (3)$$

where $P^H$ is representative of a backward projection, x is representative of the undersampled data, P is representative of a forward projection with restriction to the undersampling locations, and $f^0$ is representative of an initialized current solution.

As noted with reference to FIG. 4, the intermediate image I may be determined by processing the undersampled data x by steps 204-212. Similarly, if I' is representative of the intermediate image 312, then I' may be determined as follows:

$$I' = f^0 + [P^H(x - P(f^0))] \quad (4)$$

where $f^0$ is representative of an initialized current solution, $P^H$ is representative of a backward projection, x is representative of the undersampled data, and P is representative of a forward projection with restriction to undersampling locations.

Moreover, as previously noted with reference to FIG. 5, the intermediate image I' may be determined by processing the undersampled data x by steps 304-310. Subsequent to the determination of the intermediate image, wavelet coefficients corresponding to the intermediate image may be determined, as noted with reference to step 100 of FIG. 3. The wavelet coefficients may be determined by applying a wavelet transformation to the intermediate image, for example. In certain embodiments, the determination of wavelet coefficients is followed by determination of thresholded coefficients. More particularly, the thresholded coefficients may be determined by applying a thresholding operation to the wavelet coefficients using a variable thresholding parameter. As previously noted, a value of the variable thresholding parameter may be varied using a thresholding update factor. In certain embodiments, the variable thresholding parameter may be a function of the thresholding update factor. Accordingly, in one embodiment, if Th is representative of thresholded coefficients, s is representative of a thresholding update factor, $\lambda$ is representative of a variable thresholding parameter, and T is representative of a thresholding operation, then the thresholded coefficients Th may be determined as follows:

$$Th = T_{\lambda(s)} WT[P^H(x - P(f^0))] \quad (5)$$

where WT is representative of a wavelet transformation operation, $P^H$ is representative of a backward projection, x is representative of the undersampled data, P is representative of a forward projection with restriction to undersampling locations, and $f^0$ is representative of an initialized current solution.

Similarly, in another embodiment, the thresholded coefficients Th may be determined as follows:

$$Th' = T_{\lambda(s)} WT[f^0 + [P^H(x - P(f^0))]] \quad (6)$$

where T is representative of a thresholding operation, $\lambda$ is representative of a variable thresholding parameter, s is representative of a thresholding update factor, WT is representative of a wavelet transformation operation, $f^0$ is representative of an initialized current solution, $P^H$ is representative of a backward projection and x is representative of the undersampled data, P is representative of a forward projection with restriction to the undersampling locations.

Furthermore, in one embodiment, the thresholding operation T may be represented by equations (7) and (8), as:

$$T_{\lambda(s)} w = (abs(w) > \lambda) * (abs(w) - \lambda) * \exp(iangle(w)) \quad (7)$$

$$T_{\lambda(s)} w = (abs(w) > \lambda) * (abs(w)) * \exp(iangle(w)) \quad (8)$$

where $\lambda$ is representative of a variable thresholding parameter, s is representative of a thresholding update factor and w is representative of a wavelet transformation of the intermediate image I or I'.

Subsequent to determination of the thresholded coefficients, the plurality of coefficients may be updated. As also noted with reference to FIG. 3, the plurality of coefficients may include a list of thresholded coefficients. Accordingly, the list of thresholded coefficients may be updated such that the thresholded coefficients Th or the thresholded coefficients Th are appended to the list of thresholded coefficients.

Additionally, an updated current solution may be determined by employing the thresholded coefficients. As previously noted with reference to FIG. 3 and FIGS. 6-7, the method for updating the current solution may depend on the method used for determination of the intermediate image. In one embodiment, the updated current solution may be determined as follows:

$$f^1 = f^0 + IWT(T_{\lambda(s)}WT[P^H(x-P(f^0))]) \qquad (9)$$

where $f^1$ is representative of the updated current solution, $f^0$ is representative of an initialized current solution, IWT is representative of an inverse wavelet transformation operation, T is representative of a thresholding operation, $\lambda$ is representative of a variable thresholding parameter, s is representative of a thresholding update factor, WT is representative of a wavelet transformation operation, $P^H$ is representative of a backward projection and x is representative of the undersampled data, P is representative of a forward projection with restriction to the undersampling locations.

Similarly, in another embodiment, the updated current solution may be determined as follows:

$$f^{1'} = IWT(T_{\lambda(s)}\{WT[f^0 + P^H(x-P(f^0))]\}) \qquad (10)$$

where $f^{1'}$ is representative of the updated current solution, IWT is representative of an inverse wavelet transformation operation, T is representative of a thresholding operation, $\lambda$ is representative of a variable thresholding parameter, s is representative of a thresholding update factor, WT is representative of a wavelet transformation operation, $f^0$ is representative of an initialized current solution, $P^H$ is representative of a backward projection and x is representative of the undersampled data.

Further to determination of the updated current solution, in one embodiment, optionally, an updated current solution having smooth and sharp features may be determined. As noted above, the determination of the updated current solution having smooth and sharp features aids in retention of smooth and sharp features in a resultant image reconstructed using the present technique.

Moreover, as noted with reference to FIGS. 3 and 8, a filtered updated current solution may be determined. The filtered updated current solution, for example, may be determined by median filtering the updated current solution. Furthermore, a difference between the updated current solution and the median filtered updated current solution may be determined. Accordingly, if in one embodiment, $filt(f^1)$ is representative of a median filtered updated current solution and $f^1$ is representative of the updated current solution, then a difference may be determined as follows:

$$\Delta f^1 = f^1 - filt(f^1) \qquad (11)$$

where $\Delta f^1$ is representative of the difference.

Subsequent to the determination of the difference $\Delta f^1$, a transformation of the difference may be determined. The transformation of the difference may be followed by determination of a denoised intermediate current solution. In one embodiment, the denoised intermediate current solution may be determined as follows:

$$\Delta f_{denoised}^1 = IWT\{T_\mu[WT(\Delta f^1)]\} \qquad (12)$$

where $\Delta f_{denoised}^1$ is representative of a denoised intermediate current solution, IWT is representative of an inverse wavelet transformation operation, and WT is representative of a wavelet transformation operation.

Subsequently, an updated current solution having smooth and sharp features may be determined. In one embodiment, the updated current solution having smooth and sharp features may be determined as follows:

$$f_{ssnew}^1 = \alpha(\Delta f_{denoised}^1) + (1-\alpha)f^1 \qquad (13)$$

where $f_{ssnew}^1$ is representative of an updated current solution having smooth and sharp features, $\alpha$ is representative of a variable, and $\Delta f_{denoised}^1$ is representative of a denoised intermediate current solution.

Moreover, as previously noted with reference to FIG. 3, in one embodiment, further to the determination of the updated current solution and the updated current solution having smooth and sharp features, a check may be carried out to verify if a determined stopping criteria is satisfied to determine if a desired solution is obtained. In one embodiment, the stopping criteria may be represented as follows:

$$Stopcrir = \|x - P(f^{n+1})\| \qquad (14)$$

where Stopcrir is representative of a stopping criteria, and n is representative of an iteration number, x is representative of the undersampled data of an object, and $f^{n+1}$ is representative of the updated current solution or the updated current solution having smooth and sharp features.

In addition, the iterations are continued till the stopping criteria is satisfied. Accordingly, in certain embodiments, an updated current solution for all the possible iterations till the stopping criteria is satisfied may be represented as follows:

$$f^{n+1} = f^n + IWT(T_{\lambda(s)}\{WT[P^H(x-P(f^n))]\}) \qquad (15)$$

where $f^{n+1}$ is representative of an updated current solution for all the possible iterations, n is representative of a number of an iteration, $f^n$ is representative of the current solution, IWT is representative of an inverse wavelet transformation operation, T is representative of a thresholding operation, $\lambda$ is representative of a variable thresholding parameter, s is representative of a thresholding update factor, WT is representative of a wavelet transformation operation, $P^H$ is representative of a backward projection, x is representative of the undersampled data, P is representative of a forward projection with restriction to undersampling locations, and $f^n$ is representative of the updated current solution at an nth iteration.

Similarly, in another embodiment, the updated current solution for all the possible iterations may be determined as follows:

$$f^{n+1} = IWT(T_{\lambda(s)}\{WT[f^n + P^H(x-P(f^n))]\}) \qquad (16)$$

where $f^{n+1}$ is representative of an updated current solution for all the possible iterations, n is representative of an iteration, IWT is representative of an inverse wavelet transformation operation, T is representative of a thresholding operation, $\lambda$ is representative of a variable thresholding parameter, s is representative of a thresholding update factor, WT is representative of a wavelet transformation operation, $P^H$ is representative of a backward projection, x is representative of the undersampled data and $f^n$ is representative of the updated current solution at an $n^{th}$ iteration.

Furthermore, the updated current solution having smooth and sharp features for all possible iterations may be determined as follows:

$$f_{ssnew}^{n+1} = \alpha(\Delta f_{denoised}^{n+1}) + (1-\alpha)f^{n+1} \qquad (17)$$

where $f_{ssnew}^{n+1}$ is representative of an updated current solution having smooth and sharp features at all the possible iterations, $\alpha$ is representative of a variable, $\Delta f_{denoised}^{n+1}$ is representative of a denoised intermediate current solution and $f^{n+1}$ is representative of an updated current solution at $(n+1)^{th}$ iteration.

Also, the denoised intermediate current solution $\Delta f_{denoised}^{n+1}$ may be determined as follows:

$$\Delta f_{denoised}^{n+1} = IWT\{T_\mu[WT(\Delta f^{n+1})]\} \qquad (18)$$

where IWT is representative of an inverse wavelet transform and WT is representative of a wavelet transform, and $\Delta f^{n+1}$ is representative of a difference between the updated current solution and the filtered updated current solution.

The method and system for signal processing described hereinabove provides an exemplary compressed sensing technique that reduces processing time. The exemplary compressed sensing technique advantageously enhances computational efficiency of signal processing, while substantially reducing memory requirements. Furthermore, the method for signal processing minimizes usage of complicated cost functions.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A signal processing method, comprising:
generating undersampled data corresponding to an object;
initializing a current solution;
determining a variable thresholding parameter based on a composition of the undersampled data;
iteratively determining thresholded coefficients by applying a thresholding operation to wavelet coefficients utilizing the variable thresholding parameter to generate a plurality of coefficients; and
reconstructing a data signal using the plurality of coefficients,
wherein the wavelet coefficients correspond to an intermediate image determined utilizing the undersampled data and the current solution.

2. The method of claim 1, wherein generating the undersampled data comprises acquiring data via use of random data selection, uniform random order data selection, utilization of probability density functions, or combinations thereof.

3. The method of claim 1, wherein determining the intermediate image comprises:
forward projecting the current solution to a data space to obtain a forward projected current solution;
subtracting the forward projected current solution from the undersampled data to generate an intermediate difference; and
backward projecting the intermediate difference to an image space to determine the intermediate image.

4. The method of claim 3, wherein forward projecting the current solution further comprises undersampling the forward projected current solution at locations substantially similar to undersampled locations of the undersampled data.

5. The method of claim 3, further comprising updating the current solution to generate an updated current solution.

6. The method of claim 5, wherein updating the current solution comprises:
determining an inverse transformation of the thresholded coefficients to generate inverse transformed thresholded coefficients; and
adding the inverse transformed thresholded coefficients to the current solution to generate the updated current solution.

7. The method of claim 1, wherein determining the intermediate image comprises:
forward projecting the current solution to a data space to obtain a forward projected current solution;
subtracting the forward projected current solution from the undersampled data to generate an intermediate difference;
backward projecting the intermediate difference to an image space to determine a backward projected intermediate difference; and
adding the backward projected intermediate difference to the current solution to determine the intermediate image.

8. The method of claim 7, further comprising updating the current solution to generate an updated current solution.

9. The method of claim 8, wherein updating the current solution comprises determining an inverse transformation of the thresholded coefficients to generate the updated current solution.

10. The method of claim 1, wherein determining the wavelet coefficients comprises transforming the intermediate image to generate the wavelet coefficients.

11. The method of claim 1, wherein the thresholding operation comprises a hard thresholding operation, a soft thresholding operation, or a combination thereof.

12. The method of claim 1, wherein iteratively determining the thresholded coefficients further comprises updating the variable thresholding parameter utilizing a thresholding update factor to generate an updated variable thresholding parameter.

13. The method of claim 12, wherein updating the variable thresholding parameter comprises selecting the thresholding update factor based on an iteration number, a composition of the current solution, a composition of the undersampled data, or combinations thereof.

14. The method of claim 12, wherein the thresholding update factor comprises a factor, a multiple, a square, a square root, an absolute of the thresholding update factor, or combinations thereof.

15. The method of claim 1, further comprising iteratively determining the thresholded coefficients to generate the plurality of coefficients till a stopping criteria is satisfied.

16. The method of claim 15, wherein the stopping criteria comprises a norm difference between the undersampled data and a forward projection of an updated current solution.

17. The method of claim 1, further comprising generating a resultant image utilizing the reconstructed data signal.

18. A signal processing method, comprising:
generating undersampled data signal corresponding to an object;
initializing a current solution;
determining a variable thresholding parameter;
determining an intermediate image utilizing the undersampled data and the current solution;
determining wavelet coefficients corresponding to the intermediate image;
determining thresholded coefficients by applying a thresholding operation on the wavelet coefficients using the variable thresholding parameter;
determining an updated current solution using the thresholded coefficients;
updating the variable thresholding parameter using a thresholding update factor, wherein the thresholding update factor depends on a composition of a desired image of the object;
iteratively determining thresholded coefficients using the updated current solution, the updated variable thresholding parameter, and the undersampled data to generate a plurality of coefficients; and
reconstructing a data signal using the plurality of coefficients.

19. The method of claim 18, wherein determining the intermediate image comprises:

forward projecting the current solution to data space to determine a forward projected current solution;

subtracting the forward projected current solution from the undersampled data to generate an intermediate difference; and backward projecting the intermediate difference to an image space to obtain a backward projected intermediate difference to determine the intermediate image.

20. The method of claim 18, wherein determining the updated current solution comprises:

determining an inverse transformation of the thresholded coefficients to generate inverse transformed thresholded coefficients: and adding the inverse transformed thresholded coefficients to the current solution to generate the updated current solution.

21. The method of claim 18, wherein determining the intermediate image comprises:

forward projecting the current solution to data space to determine a forward projected current solution;

subtracting the forward projected current solution from the undersampled data to generate an intermediate difference;

backward projecting the intermediate difference to an image space to obtain a backward projected intermediate difference; and adding the backward projected intermediate difference to the current solution to determine the intermediate image.

22. The method of claim 18, wherein determining the wavelet coefficients corresponding to the intermediate image comprises transforming the intermediate image.

23. The method of claim 22, wherein transforming the intermediate image comprises computing a wavelet transformation, a gradient transformation, and the like.

24. The method of claim 18, wherein determining the updated current solution comprises determining an inverse transformation of the thresholded coefficients to determine an updated current solution.

25. A signal processing method, comprising:

generating undersampled data signal using corresponding to an object;

initializing a current solution;

determining a variable thresholding parameter;

determining an intermediate image utilizing the undersampled data and the current solution;

determining wavelet coefficients corresponding to the intermediate image;

determining thresholded coefficients by applying a thresholding operation on the wavelet coefficients using the variable thresholding parameter;

determining an updated current solution using the thresholded coefficients;

determining an updated current solution having smooth and sharp features using the updated current solution and a denoised intermediate current solution;

updating the variable thresholding parameter using a thresholding update factor, wherein the thresholding update factor depends on a composition of a desired image of the object;

iteratively determining thresholded coefficients using the updated current solution having smooth and sharp features, the updated variable thresholding parameter, and the undersampled data to generate a plurality of coefficients; and reconstructing a data signal using the plurality of coefficients.

26. The method of claim 25, wherein determining the updated current solution having smooth and sharp features comprises:

determining a filtered updated current solution by filtering the updated current solution;

determining a difference between the updated current solution and the filtered updated current solution;

determining a transformation of the difference by applying a transformation on the difference to generate a transformed difference;

determining a thresholded difference by applying a thresholding operation on the transformed difference;

determining an inverse transformed solution by applying an inverse transformation on the thresholded difference;

determining the denoised intermediate current solution by adding the filtered updated current solution to the inverse transformed solution; and determining the updated current solution having smooth and sharp features using the updated current solution and the denoised intermediate current solution.

27. A signal processing system, comprising:

an acquisition subsystem configured to generate undersampled data corresponding to an object;

a processing subsystem in operational communication with the acquisition subsystem, and comprising a signal processing platform configured to:

initialize a current solution;

determine a variable thresholding parameter based on a composition of the undersampled data;

iteratively determine thresholded coefficients by applying a thresholdinq operation to wavelet coefficients utilizing the variable thresholding parameter to generate a plurality of coefficients; and reconstruct a data signal using the plurality of coefficients wherein the wavelet coefficients correspond to an intermediate image determined utilizing the undersampled data and the current solution.

28. The system of claim 27, wherein the system comprises a computer tomography imaging system, an ultrasound imaging system, a magnetic resonance imaging system, an X-ray imaging system, a positron emission tomography imaging system, or combinations thereof.

29. The system of claim 27, wherein the object comprises a patient, baggage, or industrial parts.

30. The system of claim 27, further comprising a display device for display of transitional and reconstructed images.

31. The system of claim 27, wherein the signal processing platform is further configured to iteratively determine the thresholded coefficients to generate a plurality of coefficients till a stopping criteria is met.

* * * * *